United States Patent [19]
Good

[11] Patent Number: 4,948,303
[45] Date of Patent: Aug. 14, 1990

[54] PNEUMATIC TUBE CARRIER

[75] Inventor: Gregory G. Good, Mill Creek, Wash.

[73] Assignee: Washington Security Products, Inc., Lynnwood, Wash.

[21] Appl. No.: 266,397

[22] Filed: Nov. 2, 1988

[51] Int. Cl.⁵ .............................................. B65G 51/06
[52] U.S. Cl. ...................................... 406/186; 406/184
[58] Field of Search ............... 406/186, 184, 185, 190, 406/187; 206/214, 0.8, 0.81, 0.84

[56] References Cited

U.S. PATENT DOCUMENTS

| | | | |
|---|---|---|---|
| Re. 30,882 | 3/1982 | Leavelle | 406/186 |
| 2,491,729 | 12/1949 | Grover | 406/186 |
| 3,593,948 | 7/1971 | McClellan | 406/186 |
| 4,149,685 | 4/1979 | Leavelle | 406/186 |
| 4,470,730 | 9/1984 | Wuthrich | 406/186 |
| 4,557,638 | 12/1985 | O'Neill | 406/190 |

*Primary Examiner*—Joseph F. Peters, Jr.
*Assistant Examiner*—Anne Sartelle
*Attorney, Agent, or Firm*—Graybeal, Jensen & Puntigam

[57] ABSTRACT

A hinged container for use in a pneumatic tube including a primary container and a secondary container which is simultaneously opened and closed when the main container is opened and closed, the secondary container provides reinforcement for the hinge of the primary container.

5 Claims, 1 Drawing Sheet

PNEUMATIC TUBE CARRIER

TECHNICAL FIELD

This invention relates to pneumatic tube carriers and, more particularly, to a pneumatic tube carrier which includes, as an integral part thereof, a supplementary interior pocket for containing pens or the like and wherein said pocket is opened and closed at the same time the main tube is opened and closed. The structure of the pocket further provides additional reinforcement at the hinged portion of the carrier.

BACKGROUND ART

The transporting of articles via pneumatic tubes is old and well known. Basically, an object is placed within a container which is then transported either by air under either positive or negative pressure from one destination to another. The transport being effected in a closed tube of the same configuration as the carrier extending between the destinations.

Probably the area of commerce which currently uses the pneumatic tube and the transporting of goods via the pneumatic tube on a fairly regular basis is the finance industry. One particular application of this technology is in the area of drive-up banking where the physical communication, i.e. transfer of funds or the like, between the driver, located at an island outside the bank, and the teller, located inside the bank, occurs via a pneumatic tube. In this particular context, a problem exists in that often times the transaction requires a writing instrument such as a pen. Writing instruments cannot normally be transported since if they are free within the container they are likely to break when slammed against the end of the container upon impact, i.e. the pneumatic carrier stop, and thus spill ink on the contents of the carrier. A similar, but not as serious, problem occurs when it is necessary or desirable to transport loose change or other objects which will fly around the container during transport.

Prior art known to the inventor includes U.S. Pat. No. 242,459 to Leaycraft June 7, 1881 which discloses a pneumatic tube carrier having asymmetric hinged halves being continuously urged to a closed position by a spring means.

U.S. Pat. No. 359,456 granted to McLaughlin, Mar. 15, 1887 discloses a pneumatic tube carrier including a spindle or the like for wrapping a paper document for security during transportation from one location to another.

U.S. Pat. No. 452,471 granted to Barri, May 19, 1891 discloses a pneumatic tube apparatus wherein an opening in the surface of the container is created by twisting one coaxial section with respect to the other.

U.S. Pat. No. 769,233 granted to Pfluger, Sept. 6, 1904, discloses a cash box for use with a pneumatic tube wherein an opening in the carrier is exposed by relative twisting of the two coaxial elements.

U.S. Pat. No. 811,915 granted to Hager Feb. 6, 1906, discloses a pneumatic tube carrier including a specific stop member to prevent damage to the cylinders when the two coaxial halves are twisted relative to each other.

U.S. Pat. No. 1,169,553 granted to MacMillan, Jan. 25, 1916, discloses a means for securely latching a pneumatic tube carrier such that it does not accidentally open in transport.

U.S. Pat. No. 1,827,000 granted to Duffin Oct. 13, 1931, discloses a container for a roll of paper wherein the exterior container includes a hinge which connects two halves which are identical with the exception of an internal flap on one side for securing the container in a closed condition.

U.S. Pat. No. 2,251,238 granted to Busch, July 29, 1941, discloses a pneumatic carrier wherein the coaxial halves are twisted with respect to each other to expose a window opening and includes a spring actuated locking device.

U.S. Pat. No. 3,401,902 granted to Gouyou-Beauchamps et al, Sept. 17, 1968 discloses a large dimension open top carriage for use in pneumatic conveying of large objects.

U.S. Pat. No. 3,593,948 granted to McClellan, July 20, 1971, discloses a pneumatic carrier wherein identical halves are hinged together along one edge and includes spring means for urging the two halves to a closed cylindrical configuration for transport.

U.S. Pat. No. 3,761,039, granted to Hazell, Sept. 25, 1973 discloses a pneumatic carrier system including means for transferring documents from one individual carrier to another, enabling the use of sharp corners (transfer stations) in the transport tube itself.

U.S. Pat. No. 3,825,210, granted to Weaver, July 23, 1974 discloses a "clamshell" type pneumatic tube carrier of a bullet configuration wherein the seals which substantially fill the tube are not immediately adjacent the ends but are spaced therefrom.

U.S. Pat. No. 4,149,685, granted to Leavelle, Apr. 17, 1979 discloses a pneumatic carrier having identical halves and includes means to adjust the latch mechanism.

U.S. Pat. No. Re. 30,882 granted, Mar. 16, 1982, to Leavelle is directed to an adjustable closure mechanism.

U.S. Pat. No. 4,470,730, granted Sept. 11, 1984, to Wutherich discloses a pneumatic tube carrier having a separate pocket means to separate coinage from paper money during transport.

DISCLOSURE OF THE INVENTION

With the above noted problems and prior art in mind, it is an object of the present invention to provide a container for use in a pneumatic tube conveyance system wherein the container includes a separate but integral pocket for containing a writing instrument, coins or the like.

It is another object of the present invention to provide a container for use in pneumatic conveyance or the like wherein the main compartment includes a primary container for use with the paper, cash, receipts or the like and the act of opening the primary compartment also opens a secondary compartment into which can be placed a writing instrument or coinage or other devices desired to be kept separate.

It is still a further object of the present invention to provide a container suitable for use in a pneumatic conveyance wherein the main container includes a secondary container which not only provides a separate compartment but also serves to strengthen and reinforce the hinge section of the conveyance device thereby greatly increasing the useful life thereof.

Yet another object of the present invention is to provide a pneumatic container including an integral means for securing a pen or the like.

BRIEF DESCRIPTION OF THE DRAWINGS

FIG. 2 discloses the present invention in an open condition disclosing the separate, integral pocket for containing a writing instrument or the like.

BEST MODE FOR CARRYING OUT THE INVENTION

Figure 1:
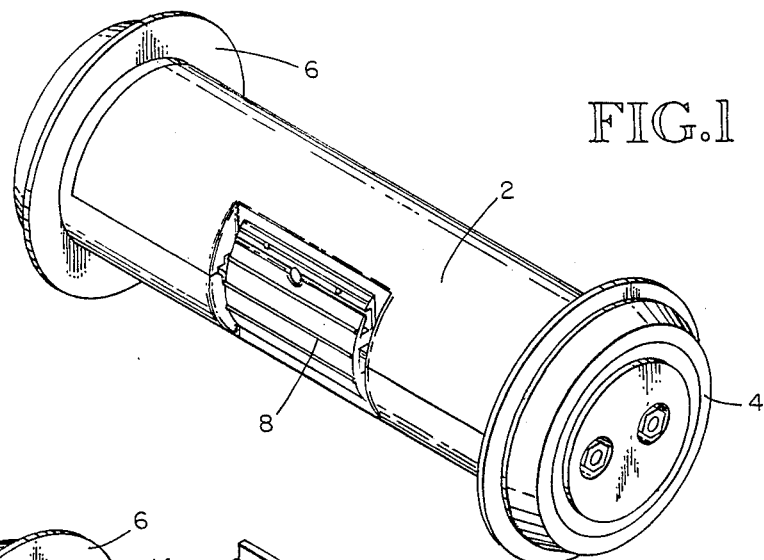
FIG. 1 discloses the present inventive pneumatic tube carrier in a closed condition.

As seen in FIG. 1, the present invention comprises a pneumatic carrier which is generally cylindrical in shape, including a cylindrical main body portion 2 having cylindrical, shock absorbing means 4, sealing elements 6 to fill the tube during transport and a latch mechanism 8. The carrier is of a size to accommodate the particular objects to be conveyed and is responsive to either positive or negative pressure within a cylindrical conveyancing tube. The pressure differential causes axial movement of the container through the tube to the desired location.

Figure 2:
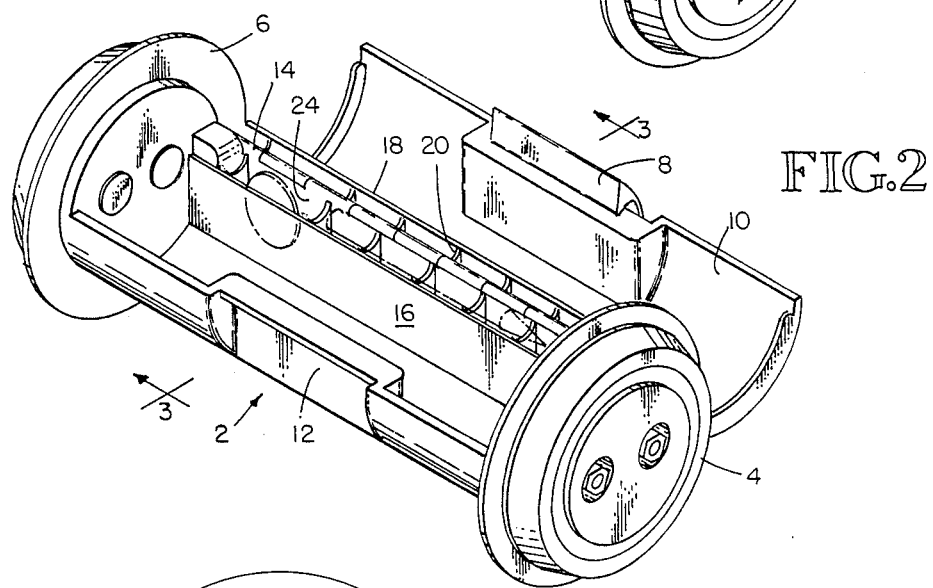
Figure 3:
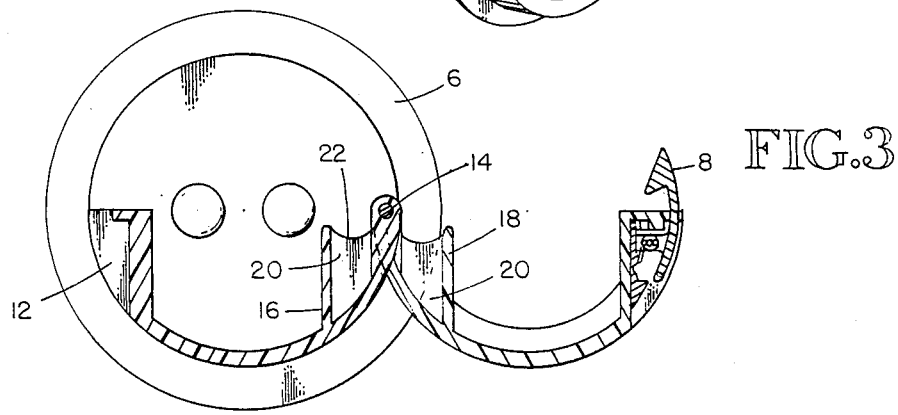
FIG. 3 is a vertical section taken along line 3—3 of FIG. 2.

Referring now to FIG. 2, it can be seen that the main cylindrical container 2 includes a pair of integral identical ends comprising the shock absorbing cushion means 4 and the sealing means 6 and further includes a hinged lid 10 preferably carrying the latch member 8 which interacts with molded and depressed area 12 allowing the container to be secured in a closed condition. The lid member 10 is joined with the main body by means of an axial hinged joint 14.

Adjacent the hinged joint 14 on both the lid 10 and the main body portion 2 is an integral separate container having walls 16, 18 joined by spaced ribs or support members 20. The dimensions of the walls 16,18 are such that they abut when the container 2 is closed and form an automatically closed separate container for encapsulating objects such as pens or coinage and keeping them separate from the main container section.

It is to be noted that the ribs 20 may well include edge depressions or surface configurations 22 to accommodate and cradle a writing instrument as well as, or alternatively, a section 24, not including ribs 20, to accommodate coinage or the like. In general, a judicious use of the ribs permits a custom configuration to accommodate any one of a number of objects.

When the lid 10 is secured in position with the interaction of latch member 10 and depression 12, the pocket formed by walls 16, 18 and ribs 20 is closed thereby separating whatever is in the secondary containment area from the main containment area.

Thus as can be seen, the present invention contemplates a secured containment for use in pneumatic transport systems but also includes an integral but separate containment for additional objects. In the process of providing the second containment the structure also greatly reinforces and improves the construction adjacent the hinged area, an area subjected to stress when in use, i.e. opening and closing.

I claim:

1. A container for use in a pneumatic transfer device or the like comprising:
    a main cylindrical container having a longitudinal hinge parallel to the axis and a latch means substantially diametrically opposite thereof whereby the container opens flat for loading or unloading;
    a second, auxiliary container within the main container adjacent the interior surface of the hinge of the main container, said auxiliary container opening and closing simultaneously with the opening and closing of the main container.

2. A container as in claim 1 which the auxiliary container is specifically designed to contain a writing instrument.

3. A container as in claim 1, wherein the auxiliary container is specifically designed to contain loose coins.

4. A container as in claim 1, wherein the auxiliary container also serves to reinforce the hinge structure.

5. A container as in claim 1, wherein the auxiliary container has one side integral with each side of the main container.

* * * * *